(12) United States Patent
Xu et al.

(10) Patent No.: US 11,632,782 B2
(45) Date of Patent: Apr. 18, 2023

(54) SPATIAL FILTERS IN FULL DUPLEX MODE

(71) Applicant: QUALCOMM Incorporated, San Diego, CA (US)

(72) Inventors: Huilin Xu, Temecula, CA (US); Muhammad Sayed Khairy Abdelghaffar, San Jose, CA (US); Ahmed Attia Abotabl, San Diego, CA (US); Krishna Kiran Mukkavilli, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 17/303,008

(22) Filed: May 18, 2021

(65) Prior Publication Data

US 2021/0410172 A1    Dec. 30, 2021

Related U.S. Application Data

(60) Provisional application No. 63/045,575, filed on Jun. 29, 2020.

(51) Int. Cl.
*H04W 72/12* (2009.01)
*H04L 5/14* (2006.01)
*H04W 88/08* (2009.01)

(52) U.S. Cl.
CPC .......... *H04W 72/1289* (2013.01); *H04L 5/14* (2013.01); *H04W 88/08* (2013.01)

(58) Field of Classification Search
CPC ...... H04W 72/1289; H04W 88/08; H04L 5/14
USPC ........................................................ 370/277
See application file for complete search history.

(56) References Cited

U.S. PATENT DOCUMENTS

2009/0164212 A1* 6/2009 Chan .................... G10L 21/0208
704/226
2018/0160224 A1* 6/2018 Graham ............... H04R 31/006

\* cited by examiner

*Primary Examiner* — Peter G Solinsky
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station in a full duplex mode, a first downlink transmission associated with a spatial filter. The UE may decode the first downlink transmission according to a default transmission configuration indicator (TCI) state that indicates the spatial filter. The default TCI state may be based at least in part on a first active TCI state for the full duplex mode. Numerous other aspects are provided.

30 Claims, 11 Drawing Sheets

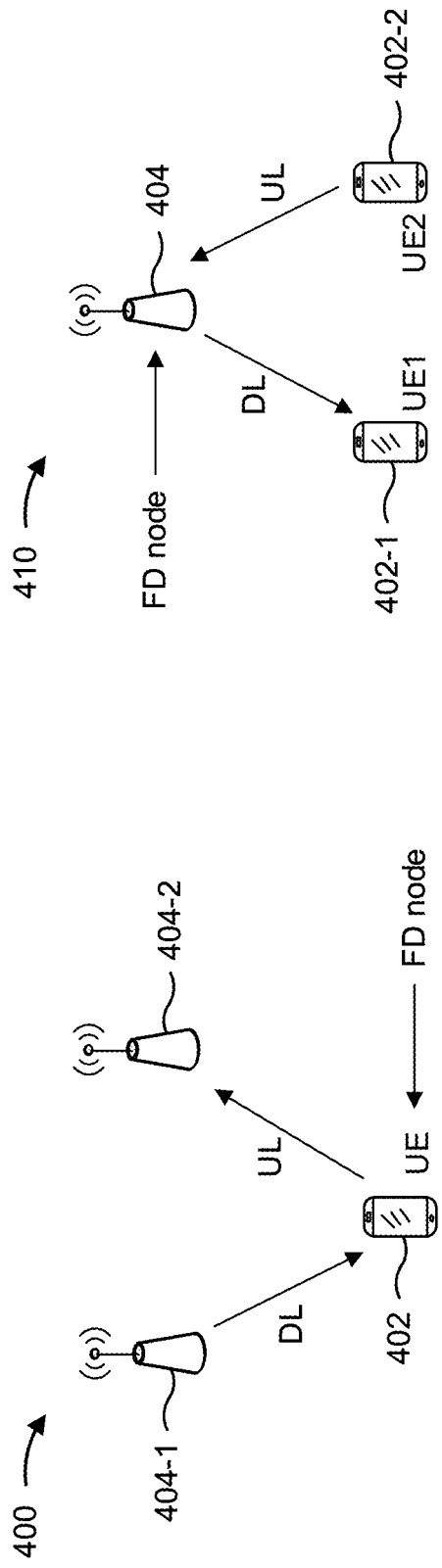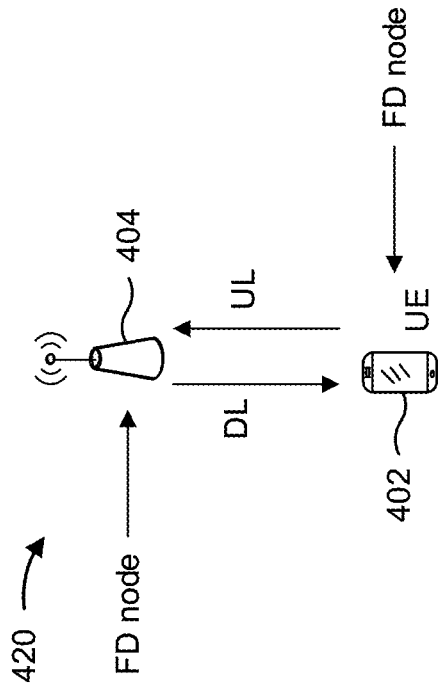
FIG. 4A
FIG. 4B
FIG. 4C

SPATIAL FILTERS IN FULL DUPLEX MODE

CROSS-REFERENCE TO RELATED APPLICATION

This patent application claims priority to U.S. Provisional Patent Application No. 63/045,575, filed on Jun. 29, 2020, entitled "SPATIAL FILTERS IN FULL DUPLEX MODE," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for activating and applying spatial filters in a full duplex mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit-receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station in a full duplex mode, a first downlink transmission associated with a spatial filter; and decoding the first downlink transmission according to a default transmission configuration indicator (TCI) state that indicates the spatial filter, wherein the default TCI state is based at least in part on a first active TCI state for the full duplex mode.

In some aspects, a method of wireless communication performed by a base station includes transmitting, to a UE in full duplex mode, a first downlink transmission associated with a spatial filter, wherein the first downlink transmission is transmitted according to a default TCI state that indicates the spatial filter, wherein the default TCI state is based at least in part on a first active TCI state for the full duplex mode; and receiving, from the UE, measurements related to the first downlink transmission, based at least in part on transmitting the first downlink transmission.

In some aspects, a UE for wireless communication includes a memory and one or more processors coupled to the memory, the memory and the one or more processors configured to receive, from a base station in a full duplex mode, a first downlink transmission associated with a spatial filter; and decode the first downlink transmission according to a default TCI state that indicates the spatial filter, wherein the default TCI state is based at least in part on a first active TCI state for the full duplex mode.

In some aspects, a base station for wireless communication includes a memory and one or more processors coupled to the memory, the memory and the one or more processors configured to transmit, to a UE in full duplex mode, a first downlink transmission associated with a spatial filter, wherein the first downlink transmission is transmitted according to a default TCI state that indicates the spatial filter, wherein the default TCI state is based at least in part on a first active TCI state for the full duplex mode; and receive, from the UE, measurements related to the first downlink transmission, based at least in part on transmitting the first downlink transmission.

In some aspects, a non-transitory computer-readable medium storing a set of instructions for wireless communication includes one or more instructions that, when executed by one or more processors of a UE, cause the UE to receive, from a base station in a full duplex mode, a first downlink transmission associated with a spatial filter; and decode the first downlink transmission according to a default TCI state that indicates the spatial filter, wherein the default TCI state is based at least in part on a first active TCI state for the full duplex mode.

In some aspects, a non-transitory computer-readable medium storing a set of instructions for wireless communication includes one or more instructions that, when executed by one or more processors of a base station, cause the base station to transmit, to a UE in full duplex mode, a first downlink transmission associated with a spatial filter, wherein the first downlink transmission is transmitted according to a default TCI state that indicates the spatial filter, wherein the default TCI state is based at least in part on a first active TCI state for the full duplex mode; and receive, from the UE, measurements related to the first downlink transmission, based at least in part on transmitting the first downlink transmission.

In some aspects, an apparatus for wireless communication includes means for receiving, from a base station in a full duplex mode, a first downlink transmission associated with a spatial filter; and means for decoding the first downlink transmission according to a default TCI state that indicates the spatial filter, wherein the default TCI state is based at least in part on a first active TCI state for the full duplex mode.

In some aspects, an apparatus for wireless communication includes means for transmitting, to a UE in full duplex mode, a first downlink transmission associated with a spatial filter, wherein the first downlink transmission is transmitted according to a default TCI state that indicates the spatial filter, wherein the default TCI state is based at least in part on a first active TCI state for the full duplex mode; and means for receiving, from the UE, measurements related to the first downlink transmission, based at least in part on transmitting the first downlink transmission.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A, 4B, 4C, and 4D are diagrams illustrating examples of full duplex communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
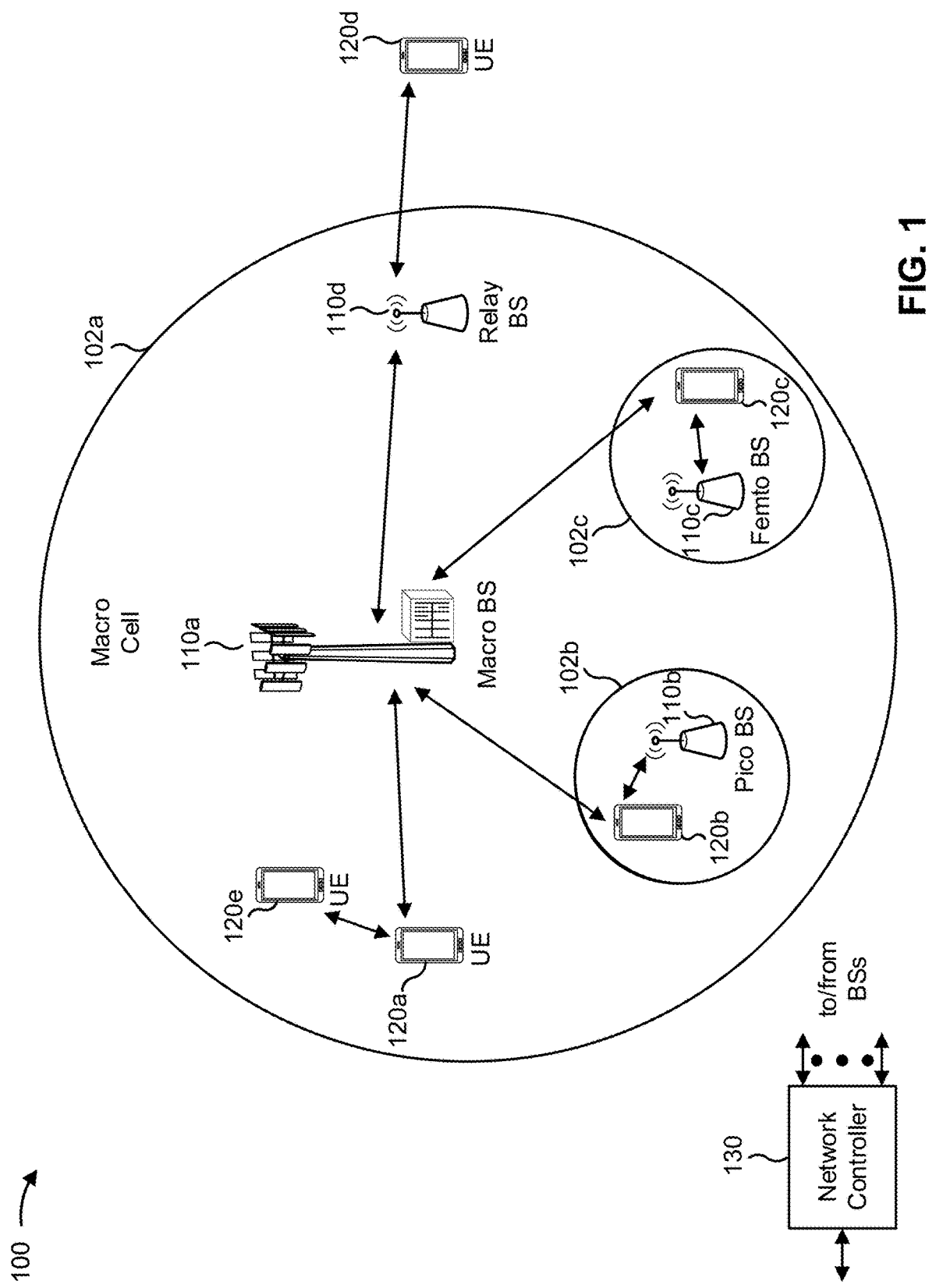
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit-receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
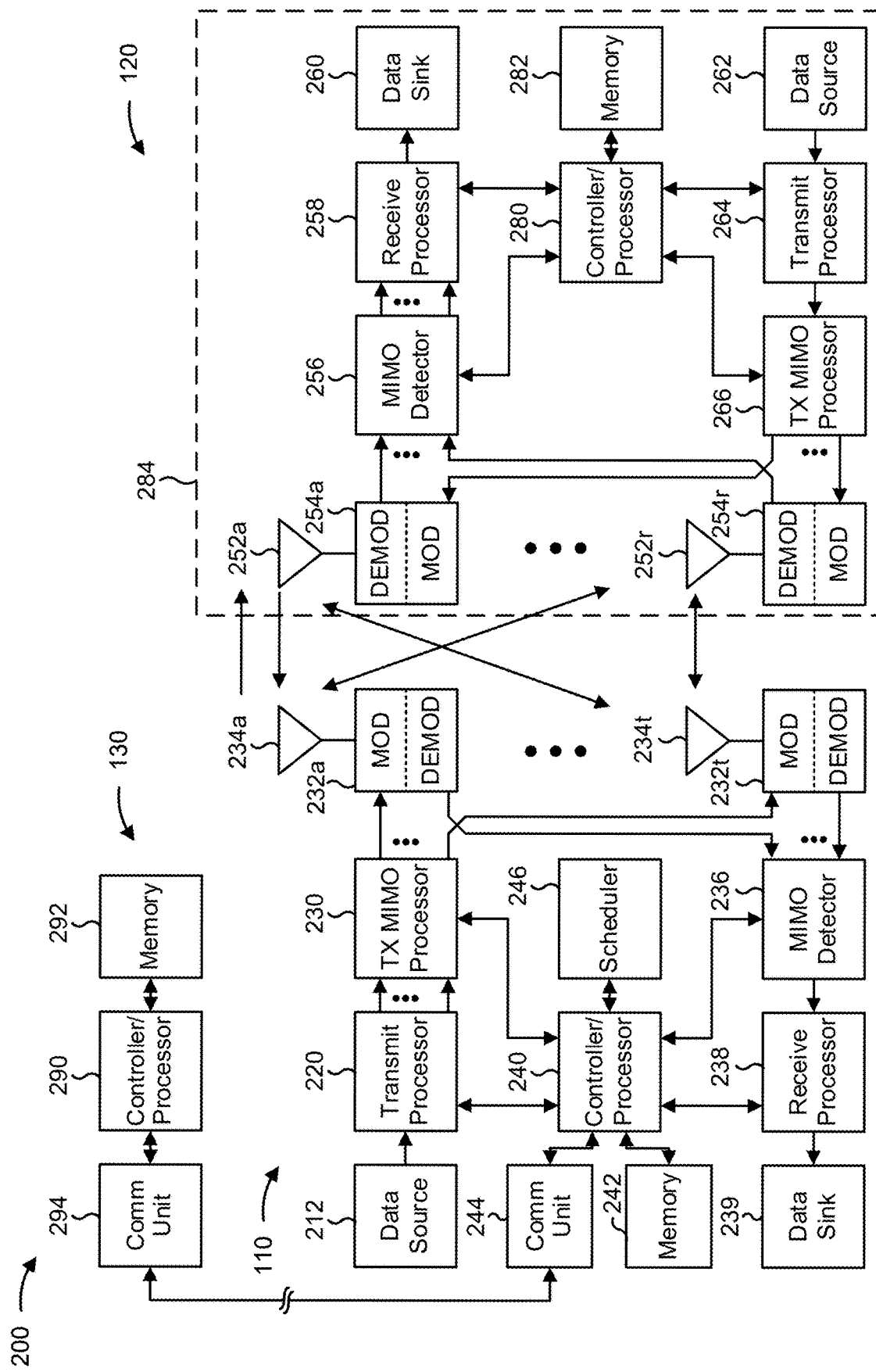
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 5A-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 5A-8).

Controller/processor 240 of base station 110, controller/processor 280 of UE 120, and/or any other component(s) of FIG. 2 may perform one or more techniques associated with activating and applying spatial filters in a full duplex mode, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a UE (e.g., the UE 120) may include means for receiving, from a base station (e.g., the base station 110) in a full duplex mode, a first downlink transmission associated with a spatial filter; and/or means for decoding the first downlink transmission according to a default transmission configuration indicator (TCI) state that indicates the spatial filter, wherein the default TCI state is based at least in part on a first active TCI state for the full duplex mode. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a base station (e.g., base station 110) may include means for transmitting, to a UE (e.g., the UE 120) in a full duplex mode, a first downlink transmission associated with a spatial filter, wherein the first downlink transmission is transmitted according to a default TCI state that indicates the spatial filter, wherein the default TCI state is based at least in part on a first active TCI state for the full duplex mode; and/or means for receiving, from the UE, measurements related to the first downlink transmission, based at least in part on transmitting the first downlink transmission. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
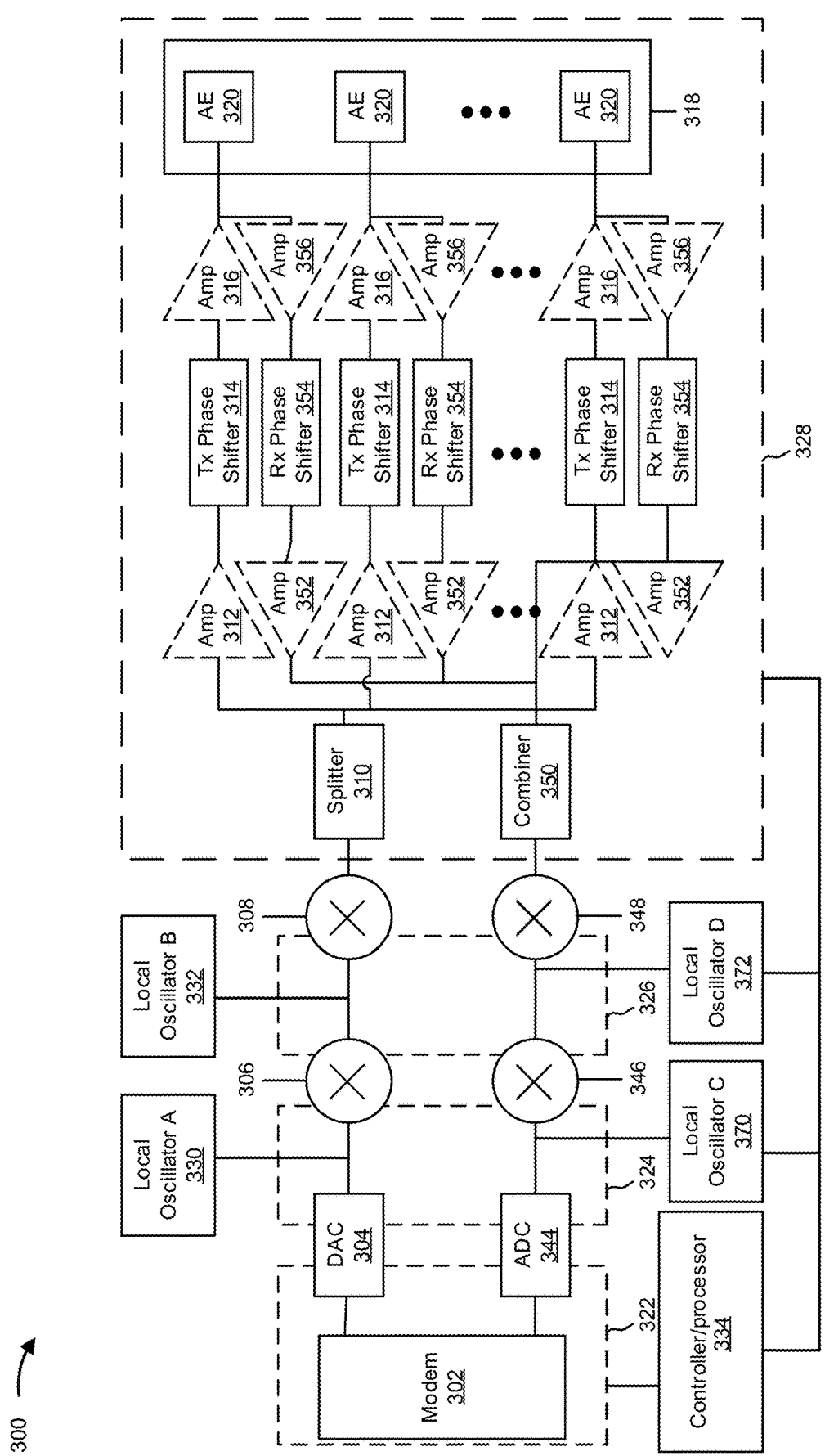
FIG. 3 is a diagram illustrating an example of a beamforming architecture that supports beamforming for millimeter wave (mmW) communications, in accordance with the present disclosure.

FIG. 3 is a diagram illustrating an example beamforming architecture 300 that supports beamforming for mmW communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306 and 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312 and 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312 and 316, respectively, are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312 and 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312 and 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312 and 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352 and 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, and 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312 and 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first amplifier 312 and/or second amplifier 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312 and 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

FIGS. 4A, 4B, and 4C are diagrams illustrating examples 400, 410, and 420, respectively, of full duplex communication. As shown in FIGS. 4A-4C, examples 400, 410, and 420 each include one or more UEs 402 in communication with one or more base stations (or TRPs) 404 in a wireless network that supports full duplex communication. However, it will be appreciated that the devices shown in FIGS. 4A-4C are provided by way of example only, and that the wireless network may support full duplex communication between other devices (e.g., between a mobile termination (MT) node and a control node (for example, a central unit (CU) or a distributed unit (DU)), between a child node and a parent node in an integrated access backhaul (IAB) network, and/or between a scheduled node and a scheduling node).

As shown in FIG. 4A, example 400 includes a UE 402 in communication with two base stations (or TRPs) 404-1 and 404-2. As shown in FIG. 4A, the UE 402 may transmit one or more uplink transmissions to base station 404-1 and may concurrently receive one or more downlink transmissions from base station 404-2. Accordingly, in the example 400 shown in FIG. 4A, full duplex communication is enabled for the UE 402, which may be operating as a full duplex node, but not for the base stations 404-1 and 404-2, which may be operating as half duplex nodes. Additionally, or alternatively, as shown in FIG. 4B, example 410 includes two UEs, UE1 402-1 and UE2 402-2, in communication with a base station (or TRP) 404. In this case, the base station 404 may transmit one or more downlink transmissions to the UE1 402-1 and may concurrently receive one or more uplink transmissions from the UE2 402-2. Accordingly, in the example 410 shown in FIG. 4B, full duplex communication is enabled for the base station 404, which may be operating as a full duplex node, but not for the UE1 402-1 and UE2 402-2, which may be operating as half duplex nodes. Additionally, or alternatively, as shown in FIG. 4C, example 420 includes a UE 402 in communication with a base station (or TRP) 404. In this case, the base station 404 may transmit, and the UE 402 may receive, one or more downlink transmissions concurrently with the UE 402 transmitting, and the base station 404 receiving, one or more uplink transmissions. Accordingly, in the example 420 shown in FIG. 4C, full duplex communication is enabled for both the UE 402 and the base station 404, each of which is operating as a full duplex node.

Utilizing full duplex communication provides reduced latency by allowing a full duplex node to transmit or receive a downlink signal in an uplink-only slot and/or to transmit or receive an uplink signal in a downlink-only slot. In addition, full duplex communication enhances spectral efficiency and/or network throughput (e.g., on a per cell and/or per UE basis), which results in more efficient resource utilization, by simultaneously utilizing time and frequency resources for uplink and downlink communication.

As indicated above, FIGS. 4A-4C are provided as examples. Other examples may differ from what is described with regard to FIGS. 4A-4C.

Figure 4D:
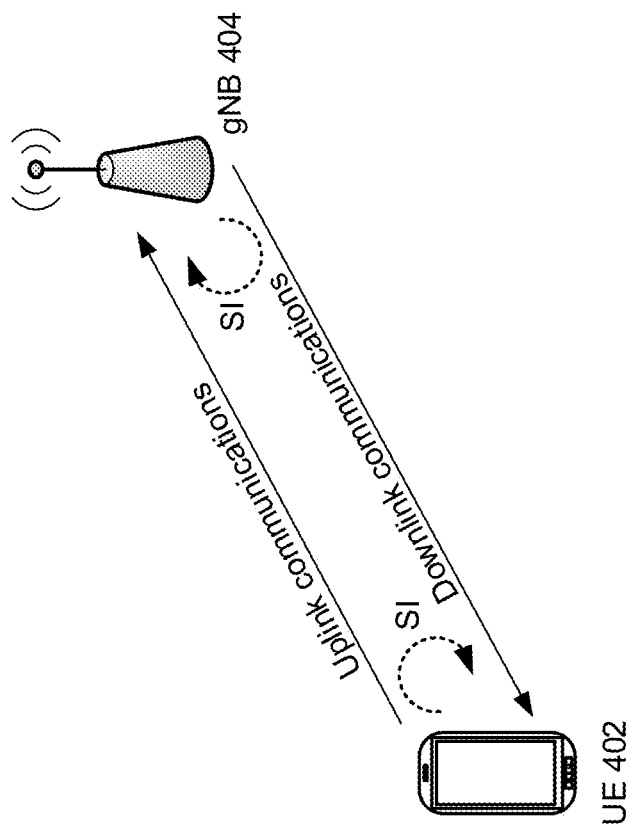

FIG. 4D is a diagram illustrating another example 430 of full duplex communication. As shown in FIG. 4D, example 430 includes a UE 402 in communication with a base station (e.g., gNB 404), or another type of TRP, in a wireless network that supports full duplex communication (e.g., wireless network 100 of FIG. 1). However, it will be appreciated that the devices shown in FIG. 4D are provided by way of example only, and that the wireless network may support full duplex communication between other devices (e.g., between an MT node and a control node, between a child node and a parent node in an IAB network, and/or between a scheduled node and a scheduling node).

As shown in FIG. 4D, the UE 402 may experience self-interference (SI) between uplink communications to the gNB 404 and downlink communications from the gNB 404. Similarly, the gNB 404 may experience SI between uplink communications from the UE 402 and downlink communications to the UE 402. In some aspects, the SI may be caused by overlaps in time and/or frequency between the uplink communications and downlink communications (e.g., as described below in connection with FIG. 5A). Additionally, or alternatively, the SI may be caused by little to no guard time and/or frequency between the uplink communications and downlink communications (e.g., as described below in connection with FIGS. 5B-5C).

Accordingly, full duplex communication may be performed by selecting suitable uplink and downlink beam pairs (e.g., transmit and receive beams that are associated with different antenna panels of a UE and/or associated with different antenna panels and/or TRPs of a base station) to reduce or minimize self-interference (especially clutter echo) via spatial isolation. Accordingly, the UE 402 and/or the gNB 404 may determine uplink and downlink beams, that are separated on respective antenna panels (and/or TRPs), to provide reliable full duplex communication by selecting beam pairs that minimize, or at least reduce, self-interference at the UE 402 and/or the gNB 404, respectively.

Measuring self-interference at a wireless node with full duplex capabilities may assist in determining uplink and downlink beam pairs that support full duplex communication. For example, the UE 402 (or an IAB child node, an MT unit, and/or another similar node) may obtain self-interference measurements to determine one or more candidate uplink transmit beams that can be paired with one or more candidate downlink receive beams. Additionally, or alternatively, the gNB 404 (or an IAB parent node, a CU, a DU, and/or another similar node) may obtain self-interference measurements to determine one or more candidate uplink receive beams that can be paired with one or more candidate downlink transmit beams. In general, to obtain the self-interference measurements, a wireless node with full duplex capabilities may transmit a signal from a first set of antennas (and/or TRPs) in one or more transmit beam directions, and the wireless node may concurrently measure a received signal (e.g., a reflected or leaked transmit signal) on a second set of antennas (and/or TRPs) in one or more receive beam directions, where the first set of antennas may be different from or the same as the second set of antennas.

In some situations, a UE may receive a downlink transmission (e.g., from a base station) using a transmission configuration, such as a TCI state (e.g., represented by a TCI-State data structure, as defined in 3GPP specifications and/or another standard). For example, a base station and the UE may be configured for beamformed communications, where the base station may transmit in the direction of the UE using a directional BS transmit beam, and the UE may receive the transmission using a directional UE receive beam. Each BS transmit beam may have an associated beam ID, beam direction, or beam symbols, among other examples. Additionally, a downlink beam, such as a BS transmit beam or a UE receive beam, may be associated with a TCI state. A TCI state may indicate a directionality or a characteristic of the downlink beam, such as one or more quasi-co-location (QCL) properties of the downlink beam. For example, a QCL property may be indicated using a qcl-Type indicator within a QCL-Info data structure, as defined in 3GPP specifications and/or another standard. A QCL property may include, for example, a Doppler shift, a Doppler spread, an average delay, a delay spread, or spatial receive parameters, among other examples. In some aspects, a TCI state may be further associated with an antenna port, an antenna panel, and/or a TRP. A TCI state may be associated with one downlink reference signal set (for example, a synchronization signal block (SSB) and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). For example, the downlink reference signal may be indicated using a referenceSignal indicator, within a QCL-Info data structure, as defined in 3GPP specifications and/or another standard. In cases where the QCL type indicates spatial receive parameters, the QCL type may correspond to analog receive beamforming parameters of a UE receive beam at the UE.

The base station may expressly indicate a QCL rule to the UE. For example, the base station may transmit a media access control (MAC) control element (MAC-CE) or other message indicating the QCL rule to use to receive messages on a physical downlink control channel (PDCCH). Additionally, or alternatively, the base station may transmit downlink control information (DCI) on a PDCCH to schedule messages on a physical downlink shared channel (PDSCH) and/or to schedule CSI-RSs, and the DCI may indicate a particular QCL rule (e.g., using a Transmission configuration indication field, as defined in 3GPP specifications and/or another standard).

In some circumstances, the base station may not expressly indicate the QCL rule to the UE. For example, an amount of time between the UE receiving the DCI and the UE receiving the downlink transmission may be too small, such that the UE is unable to determine the QCL rule before the UE begins receiving the downlink transmission. Additionally, or alternatively, the base station may decide not to include an indication of the QCL rule in the DCI (e.g., to reduce a size of the DCI, which conserves network resources, processing resources at the base station and the UE, and power at the base station and the UE). Accordingly, the UE and the base station may apply one or more rules to determine a default QCL rule to use when the base station does not expressly indicate a QCL rule to the UE.

However, in some situations, the base station may transmit some messages in full duplex symbols and other messages in half duplex symbols. The default QCL rule may be optimal for one of the full duplex symbols or the half duplex symbols, yet suboptimal for the other of the full duplex symbols or the half duplex symbols. For example, the full duplex symbols may experience increased self-interference at the UE when the default QCL rule is one that is optimal for the half duplex symbols. Accordingly, the UE will experience lower quality and/or reliability when receiving the corresponding messages. Additionally, base station may have to consume additional network overhead and/or processing resources in order to retransmit those messages when the quality and/or reliability is too low for the UE to receive and/or successfully decode those messages.

Some aspects described herein relate to techniques and apparatuses that enable determination of default TCI states (and corresponding spatial filters from QCL rules included in those default TCI states) for both messages from a base station (e.g., gNB 404) using full duplex symbols and messages from the gNB 404 using half duplex symbols. In some aspects, techniques and apparatuses described herein may provide the gNB 404 and a UE (e.g., UE 402) with rules to determine default TCI states based at least in part on whether a message from the gNB 404 uses full duplex symbols and/or half duplex symbols. Accordingly, the gNB 404 and the UE 402 experience improved reliability and/or quality of full duplex communications. Additionally, the gNB 404 and the UE 402 may conserve network overhead, processing resources, and power by reducing a number of retransmissions of the downlink communications that may be required due to low reliability and/or quality.

As indicated above, FIG. 4D is provided as an example. Other examples may differ from what is described with regard to FIG. 4D.

Figure 5A:
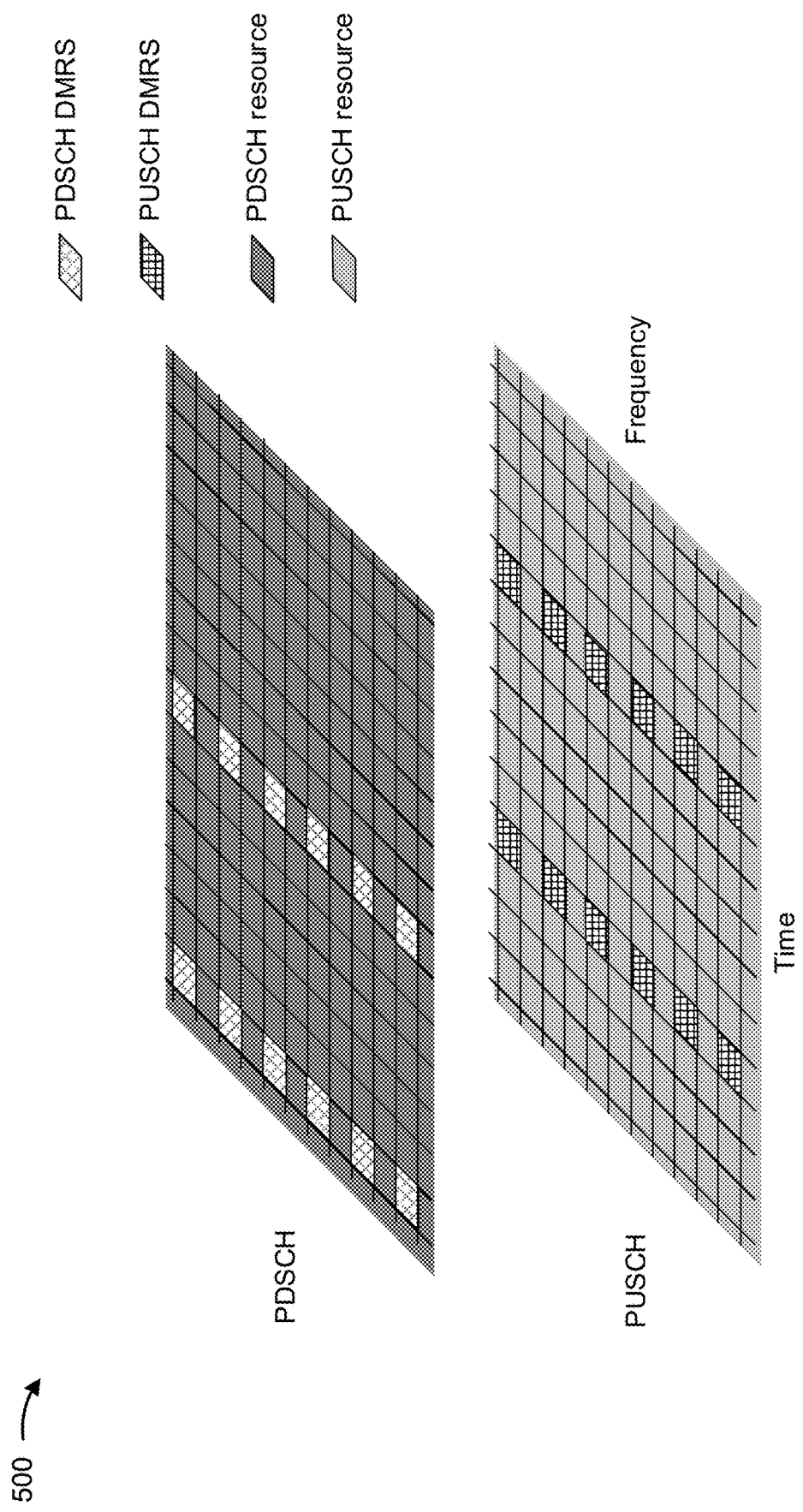
FIGS. 5A, 5B, and 5C are diagrams illustrating examples of overlapping or neighboring symbols in full duplex communication, in accordance with the present disclosure.
Figure 5B:
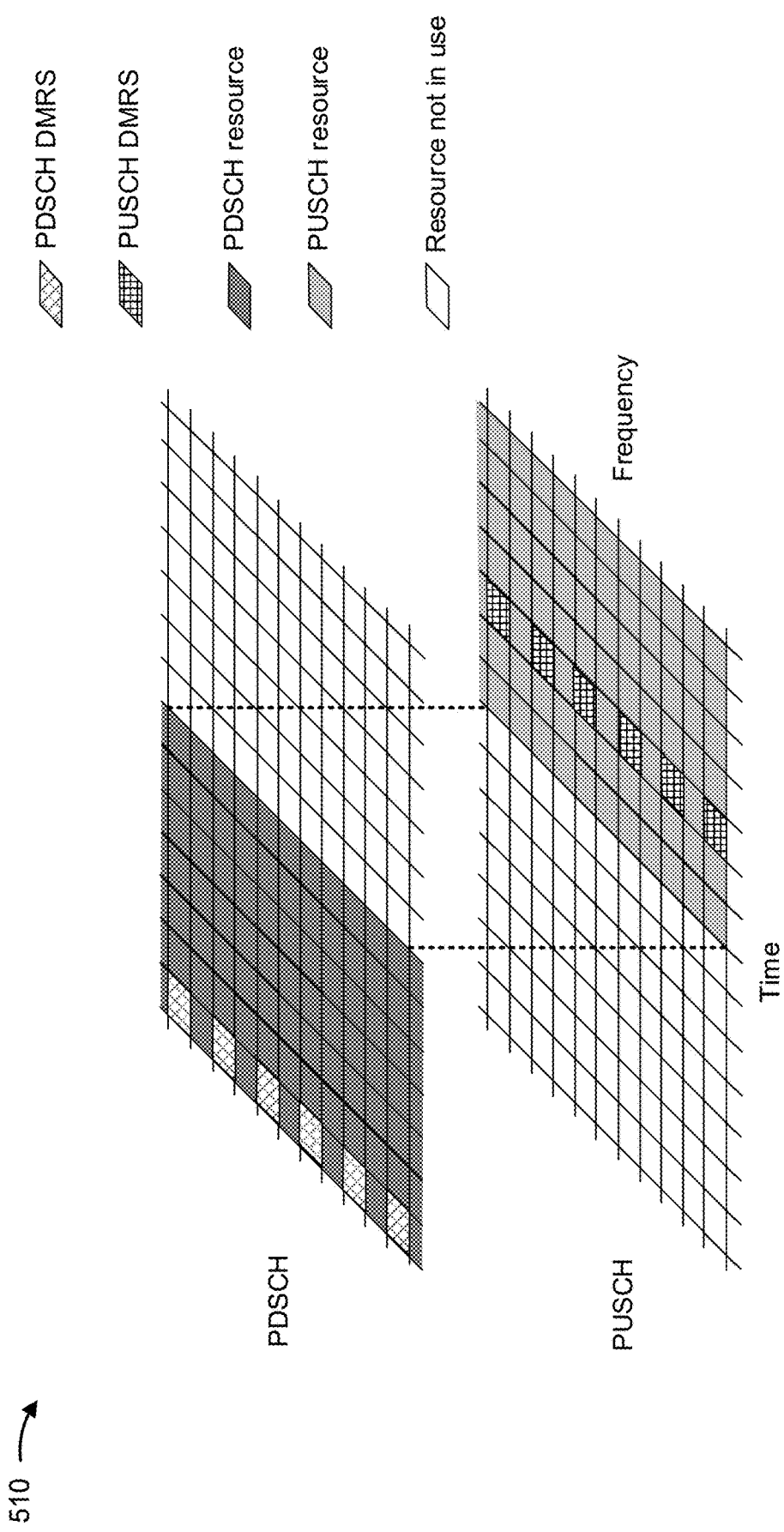
Figure 5C:
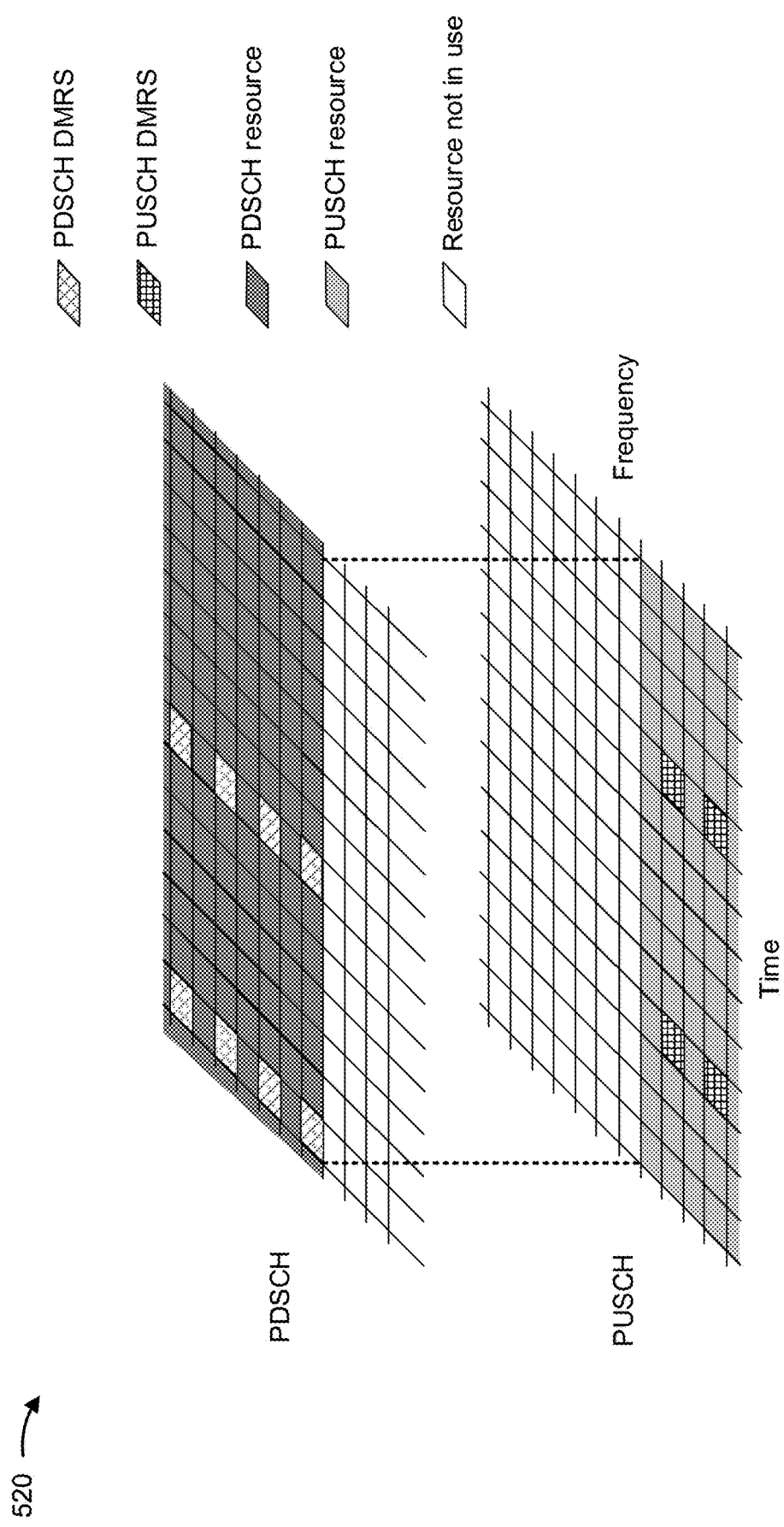

FIGS. 5A, 5B, and 5C are diagrams illustrating examples 500, 510, and 520, respectively, of overlapping or neighboring symbols in full duplex communication. Examples 500, 510, and 520 each include symbols depicted as areas within a time dimension and a frequency dimension. In FIGS. 5A-5C, uplink communications and downlink communications use the shaded symbols for respective uplink and downlink channels. Examples 500, 510, and 520 each show uplink symbols, including DMRS, for a physical uplink shared channel (PUSCH), and downlink symbols, including DMRS, for a physical downlink shared channel (PDSCH). Although the description below will focus on a PUSCH and a PDSCH, the description similarly applies to other channels for uplink communications and/or other channels for downlink communications, respectively.

Examples 500, 510, and 520 each may be associated with a full duplex mode of a UE (e.g., UE 402, UE 120, and/or another network node, such as an MT unit and/or a child IAB node) and/or a base station (e.g., gNB 404, base station 110, and/or another network node, such as a CU, a DU, and/or a parent IAB node). As shown in FIG. 5A, example 500 includes at least some downlink symbols and at least some uplink symbols that overlap in time and frequency. Accordingly, in example 500, the UE 402 may transmit and receive, in a same frequency bandwidth, concurrently. For example, the UE 402 may transmit to the gNB 404, and receive from the gNB 404, concurrently in one or more overlapping frequencies.

As shown in FIG. 5B, example 510 includes at least some uplink symbols that neighbor at least some downlink symbols in time. Although FIG. 5B shows no guard time between the neighboring symbols, the description similarly applies to a configuration in which at least some uplink symbols are separated from at least some downlink symbols in time by less than a threshold amount of time. Accordingly, in example 510, the UE 402 may transmit a first set of symbols and receive a second set of symbols, in a same frequency bandwidth, where the first set of symbols and the second set of symbols are separated in time with no guard time or with a guard time less than the threshold amount of time. For example, the UE 402 may transmit to the gNB 404 during a first time period, and receive from the gNB 404 during a second time period, in one or more overlapping frequencies.

As shown in FIG. 5C, example 520 includes at least some uplink symbols that neighbor at least some downlink symbols in frequency. Although FIG. 5C shows no guard band between the neighboring symbols, the description similarly applies to a configuration in which at least some uplink symbols are separated from at least some downlink symbols in frequency by less than a threshold amount of frequency. Accordingly, in example 520, the UE 402 may transmit a first set of symbols in a first frequency bandwidth and, concurrently, receive a second set of symbols in a second frequency bandwidth, where the first frequency bandwidth and the second frequency bandwidth are separated in frequency with no guard band or with a guard band less than the threshold amount of frequency. For example, the UE 402 may, concurrently, transmit to the gNB 404 in a first set of frequencies and receive from the gNB 404 in a second set of frequencies.

As indicated above, FIGS. 5A-5C are provided as examples. Other examples may differ from what is described with regard to FIGS. 5A-5C.

Figure 6:
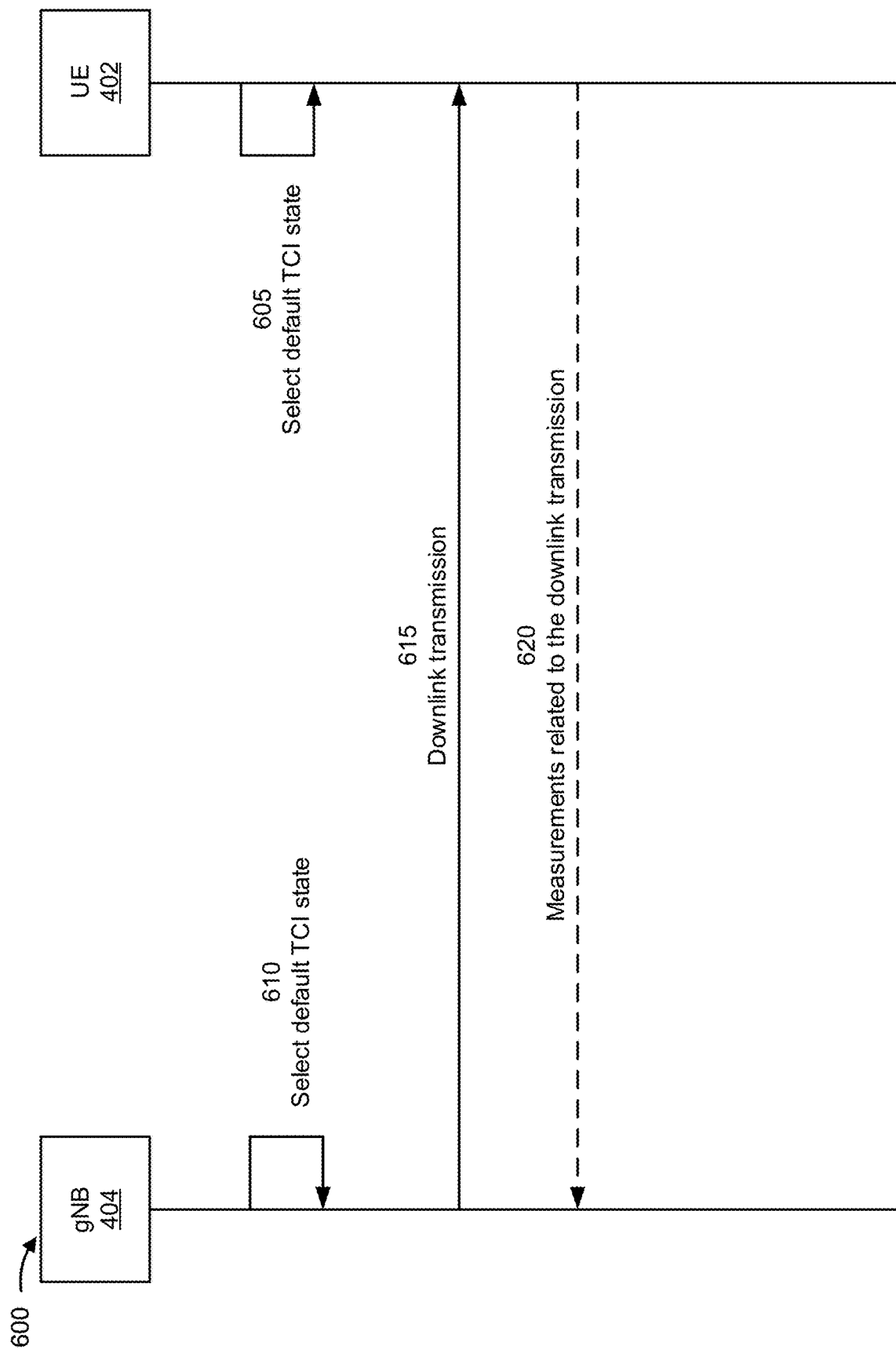
FIG. 6 is a diagram illustrating an example of activating and applying spatial filters in a full duplex mode, in accordance with the present disclosure.

FIG. 6 is a diagram illustrating an example 600 of activating and applying spatial filters in a full duplex mode, in accordance with the present disclosure. As shown in FIG. 6, example 600 includes a UE (e.g., UE 402, UE 120, and/or another network node, such as an MT unit and/or a child IAB node) communicating with a node (e.g., gNB 404, base station 110, and/or another network node, such as a CU, a DU, and/or a parent IAB node). For example, the node may communicate with the UE 402 on a wireless network (e.g., wireless network 100 of FIG. 1). Although the description below will focus on the node being gNB 404, the description applies similarly to another network node in communication with the UE 402.

In example 600, the UE 402 and/or the gNB 404 may operate in a full duplex mode (e.g., as described above in connection with FIGS. 4A-4D). As described above in connection with FIG. 5A, the gNB 404, when in the full duplex mode, may transmit and receive, in a same frequency bandwidth, concurrently. Additionally, or alternatively, as described above in connection with FIG. 5B, the gNB 404, when in the full duplex mode, may transmit a first set of symbols and receive a second set of symbols, in a same frequency bandwidth, where the first set of symbols and the second set of symbols are separated in time by less than a time threshold. Additionally, or alternatively, as described above in connection with FIG. 5C, the gNB 404, when in the full duplex mode, may transmit a first set of symbols in a first frequency bandwidth and, concurrently, receive a second set of symbols in a second frequency bandwidth, where the first frequency bandwidth and the second frequency bandwidth are separated in frequency by less than a frequency threshold.

As shown in connection with reference numbers 605 and 610, the UE 402 and the gNB 404, respectively, may determine a default TCI state indicating a default QCL relationship to use for a first downlink transmission. For example, the default TCI state may be based at least in part on a first active TCI state for the full duplex mode. In some aspects, the default TCI state may indicate a spatial filter. For example, the default TCI state may include a QCL rule that associates a reference signal (e.g., an SSB, a CSI-RS, and/or another reference signal) with the spatial filter.

In some aspects, the first active TCI state may be associated with a second downlink transmission that includes at least one same symbol as the first downlink transmission. For example, the at least one same symbol may be a full duplex symbol. In some aspects, the second downlink transmission may include a PDSCH message, a PDCCH message, a CSI-RS, and/or another downlink signal.

In some aspects, the first active TCI state for the full duplex mode may be independent of a second active TCI state for a half duplex mode. For example, the second active TCI state may be associated with another downlink transmission that includes at least one half duplex symbol. Accordingly, the gNB 404 and/or the UE 402 may refrain from selecting the second active TCI state as the default TCI state at least in part because the second active TCI state is associated with the half duplex mode and not the full duplex mode.

In some aspects, the gNB 404 and/or the UE 402 may select the first active TCI state as the default TCI state based at least in part on a determination that the first active TCI state is associated with a set of resources that is within a same type of symbols (e.g., full duplex symbols and/or half duplex symbols) as the first downlink transmission. For example, the gNB 404 and/or the UE 402 may select the first active TCI state when the first active TCI state is for a set of resources associated with DCI that schedules the first downlink transmission and/or associated with another slot in which the gNB 404 transmitted, and the UE 402 received, another downlink message. In some aspects, the set of resources may be a control resource set (CORESET).

Additionally, or alternatively, the first downlink transmission may include a type of symbols (e.g., full duplex symbols and/or half duplex symbols), and the gNB 404 and/or the UE 402 may select the first active TCI state as the default TCI state based at least in part on a determination that the first active TCI state is associated with the same type of symbols. Additionally, or alternatively, the first active TCI state may be associated with a lowest identifier (e.g., a smallest index) of one or more TCI states for the full duplex mode associated with a PDSCH. For example, the gNB 404 and/or the UE 402 may select the first active TCI state at least in part because the first active TCI state is associated with a lowest identifier of one or more identifiers for one or more full duplex TCI states used in a downlink slot. The gNB 404 and/or the UE 402 may refrain from selecting a TCI state associated with the absolute lowest identifier when the TCI state associated with the absolute lowest identifier is for the half duplex mode. Instead, the gNB 404 and/or the UE 402 may select the first active TCI state at least in part because the first active TCI state is for the full duplex mode.

Additionally, or alternatively, the gNB 404 and/or the UE 402 may select the first active TCI state as the default TCI state based at least in part on a determination that the first active TCI state is usable for the full duplex mode. For example, the UE 402 may previously have measured self-interference for downlink transmissions using one or more TCI states. Based at least in part on the self-interference measurements, the UE 402 may have determined whether the one or more TCI states were usable (e.g., satisfying a threshold) and/or unusable (e.g., failing to satisfy the threshold). The UE 402 may have stored (e.g., in a memory) determinations of which TCI states were usable and/or transmitted the determinations to the gNB 404. Accordingly, the gNB 404 and/or the UE 402 may select the first active TCI state as the default TCI state based at least in part on one of the determinations indicating that the first active TCI state is usable. Additionally, or alternatively, the gNB 404 and/or the UE 402 may select the first active TCI state as the default TCI state based at least in part on a determination that a second active TCI state is not usable for the full duplex mode. Accordingly, the gNB 404 and/or the UE 402 may refrain from selecting the second active TCI state and proceed to select the first active TCI state.

As shown in connection with reference number 615, the gNB 404 may transmit, and the UE 402 may receive, the first downlink transmission. In some aspects, the first downlink transmission may be associated with the spatial filter indicated by the default TCI state. For example, the gNB 404 may transmit a directional beam (e.g., using the hardware described above in connection with FIG. 3) consistent with the spatial filter. Additionally, or alternatively, the UE 402 may receive the first downlink transmission by applying the spatial filter. For example, the UE 402 may determine the spatial filter using a reference signal associated with the spatial filter according to a QCL rule included in the default TCI state and apply the determined spatial filter to receive (and decode) the first downlink transmission.

In some aspects, the first downlink transmission may include a CSI-RS, a PDSCH message, and/or another downlink signal. In some aspects, the first downlink transmission may be scheduled by DCI. For example, the gNB 404 may transmit, and the UE 402 may receive, the DCI before the gNB 404 transmits, and the UE 402 receives, the first downlink transmission (e.g., based at least in part on information included in the DCI).

In some aspects, the UE 402 may receive the first downlink transmission from a TRP of a plurality of TRPs of the gNB 404. Accordingly, the gNB 404 and/or the UE 402 may select the first active TCI state as the default TCI state based at least in part on a determination that the first active TCI state is associated with the same TRP. In some aspects, the gNB 404 and/or the UE 402 may select default TCI states, for the full duplex mode, per TRP of the plurality of TRPs of the gNB 404.

As further shown in connection with reference number 615, the UE 402 may decode the first downlink transmission according to the default TCI state that indicates the spatial filter. In some aspects, the gNB 404 may transmit, and the UE 402 may receive and decode, the first transmission according to the default TCI state when the DCI scheduling the first downlink transmission does not indicate a TCI state for the first downlink transmission.

Additionally, or alternatively, the gNB 404 may transmit, and the UE 402 may receive and decode, the first transmission according to the default TCI state when an amount of time between the UE 402 receiving the DCI and the UE 402 receiving the first downlink transmission satisfies a threshold. For example, the amount of time satisfying the threshold may be indicative that the UE 402 does not have sufficient time to determine a TCI state indicated by the DCI before receiving the first downlink transmission. In some aspects, the UE 402 may not have sufficient time to decode a PDCCH message associated with the DCI, where the PDCCH message includes the TCI state indicated by the DCI.

In some aspects, symbols associated with the full duplex mode of the gNB 404 may overlap, in time and/or in frequency, with one or more symbols used for uplink communications from the UE 402, and the symbols associated with the half duplex mode of the gNB 404 may not overlap with one or more symbols used for uplink communications from the UE 402. In some aspects, when the first downlink transmission includes symbols associated with the half duplex mode of the UE 402, the first downlink transmission may not include symbols associated with the full duplex mode of the UE 402. Similarly, when the first downlink transmission includes symbols associated with the full duplex mode of the UE 402, the first downlink transmission may not include symbols associated with the half duplex mode of the UE 402. Accordingly, in some aspects, the gNB 404 may avoid combining, in a same downlink transmission, symbols associated with the half duplex mode of the gNB 404 with symbols associated with the full duplex mode of the gNB 404.

As an alternative, the first downlink transmission may include a first set of symbols associated with the half duplex mode of the gNB 404 and a second set of symbols associated with the full duplex mode of the gNB 404. As explained above, the first set of symbols may overlap, in time and/or in frequency, with one or more symbols used for uplink communications from the UE 402, and the second set of symbols may not overlap with one or more symbols used for uplink communications from the UE 402. In some aspects, the gNB 404 and/or the UE 402 may select the default TCI state based at least in part on a first active TCI state for the full duplex mode or based at least in part on a second active TCI state for the half duplex mode, and not according to a combination of the first active TCI state and the second active TCI state. For example, the gNB 404 and/or the UE 402 may apply one or more rules (e.g., preconfigured and/or based at least in part on the control information) to select, as the default TCI state, a TCI state associated with the full duplex mode of the gNB 404 (such as the first active TCI state) or a TCI state associated with the half duplex mode of the gNB 404 (such as the second active TCI state) when a downlink communications includes a combination of half duplex symbols and full duplex symbols. As an alternative, the gNB 404 and/or the UE 402 may select, as the default TCI state, a combination of the active first TCI state and the second active TCI state.

In some aspects, and as shown in connection with reference number 620, the UE 402 may transmit, and the gNB 404 may receive, measurements related to the first downlink transmission. For example, the UE 402 may measure self-interference related to the first downlink transmission and transmit those measurements to the gNB 404. Additionally, or alternatively, the UE 402 may, as described above, determine one or more TCI states that are usable based at least in part on the self-interference measurements and/or one or more other TCI states that are not usable based at least in part on the self-interference measurements. Accordingly, the UE 402 may transmit, to the gNB 404, one or more indications of the one or more usable and/or unusable TCI states.

By selecting default TCI states with corresponding spatial filters (e.g., indicated by QCL rules included in the default TCI states) in accordance with techniques as described in connection with FIG. 6, the gNB 404 and the UE 402 improve the quality and/or reliability of downlink transmissions. Accordingly, on account of the improved quality and/or reliability, the gNB 404 reduces a possibility of retransmitting the downlink transmissions because the UE 402 fails to receive and/or successfully decode the downlink transmissions, thereby conserving network resources, power, and processing resources.

As indicated above, FIG. 6 is provided as an example. Other examples may differ from what is described with respect to FIG. 6.

Figure 7:
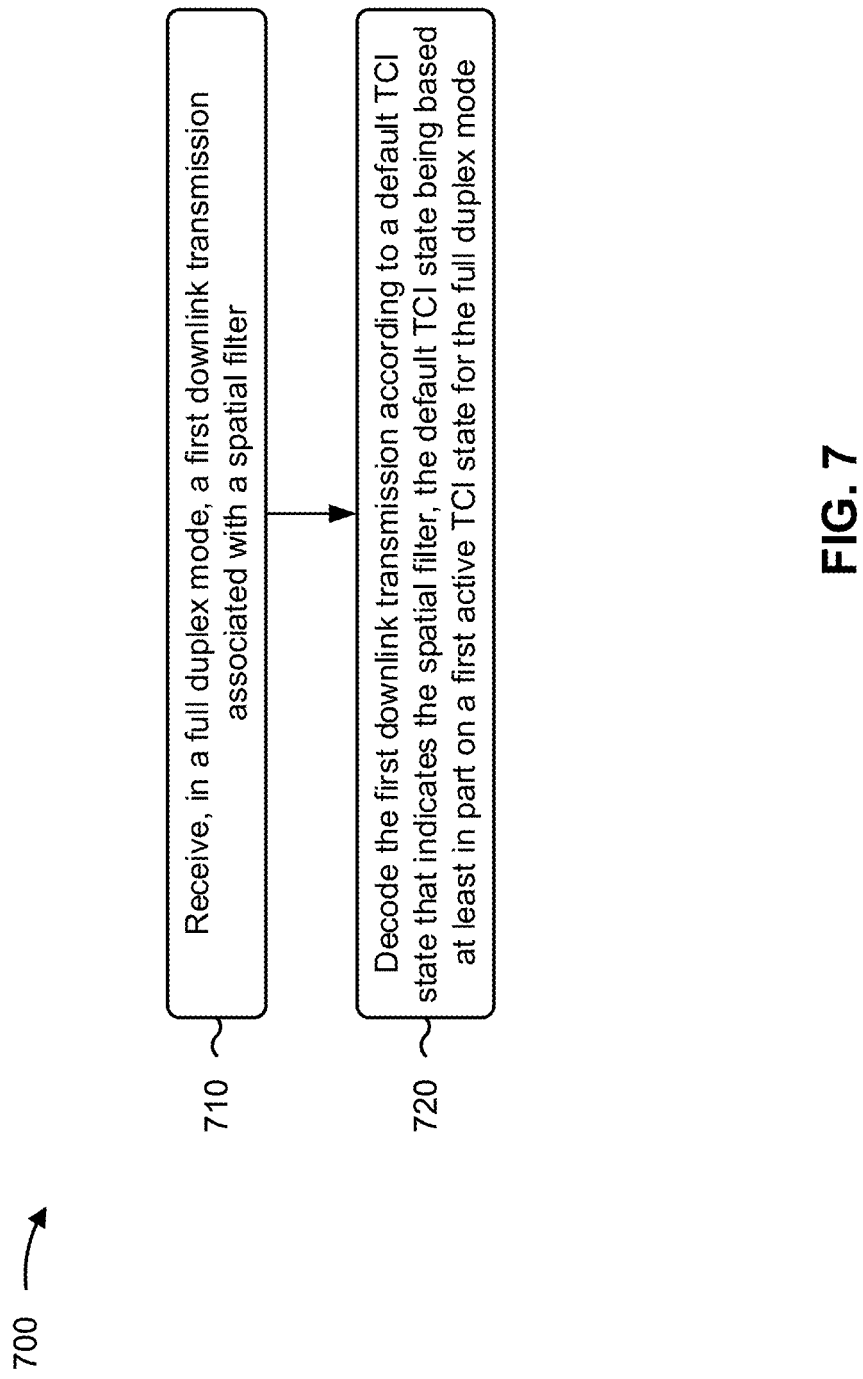
FIG. 7 is a diagram illustrating an example process performed by a UE, in accordance with the present disclosure.

FIG. 7 is a diagram illustrating an example process 700 performed, for example, by a UE, in accordance with the present disclosure. Example process 700 is an example where the UE (e.g., UE 402 and/or UE 120) performs operations associated with activating and applying spatial filters in a full duplex mode.

As shown in FIG. 7, in some aspects, process 700 may include receiving, from a base station (e.g., gNB 404 and/or base station 110) in a full duplex mode, a first downlink transmission associated with a spatial filter (block 710). For example, the UE (e.g., using one or more of antenna 252, demodulator 254, MIMO detector 256, receive processor 258, transmit processor 264, controller/processor 280, and/or memory 282) may receive the first downlink transmission associated with the spatial filter, as described above.

As further shown in FIG. 7, in some aspects, process 700 may include decoding the first downlink transmission according to a default TCI state that indicates the spatial filter (block 720). For example, the UE (e.g., using one or more of antenna 252, demodulator 254, MIMO detector 256, receive processor 258, transmit processor 264, controller/processor 280, and/or memory 282) may decode the first downlink transmission according to the default TCI state that indicates the spatial filter, as described above. In some aspects, the default TCI state is based at least in part on a first active TCI state for the full duplex mode.

Process 700 may include additional aspects, such as any single aspect or any combination of aspects described below and/or in connection with one or more other processes described elsewhere herein.

In a first aspect, the first downlink transmission includes a CSI-RS.

In a second aspect, alone or in combination with the first aspect, the first downlink transmission includes a PDSCH message.

In a third aspect, alone or in combination with one or more of the first and second aspects, the first downlink transmission is scheduled by DCI.

In a fourth aspect, alone or in combination with one or more of the first through third aspects, decoding the first downlink transmission includes decoding the first downlink transmission according to the default TCI state when the DCI does not indicate a TCI state for the first downlink transmission.

In a fifth aspect, alone or in combination with one or more of the first through fourth aspects, decoding the first downlink transmission includes decoding the first downlink transmission according to the default TCI state when an amount of time between the UE receiving the DCI and the UE receiving the first downlink transmission satisfies a threshold.

In a sixth aspect, alone or in combination with one or more of the first through fifth aspects, the first active TCI state is associated with a second downlink transmission that includes at least one same symbol as the first downlink transmission.

In a seventh aspect, alone or in combination with one or more of the first through sixth aspects, the first active TCI state for the full duplex mode is independent of a second active TCI state for a half duplex mode.

In an eighth aspect, alone or in combination with one or more of the first through seventh aspects, the first active TCI state is selected as the default TCI state based at least in part on a determination that the first active TCI state is associated with a set of resources when the set of resources is within a same type of symbols as the first downlink transmission.

In a ninth aspect, alone or in combination with one or more of the first through eighth aspects, the set of resources is a CORESET.

In a tenth aspect, alone or in combination with one or more of the first through ninth aspects, the first downlink transmission includes a type of symbols, and the first active TCI state is selected as the default TCI state based at least in part on a determination that the first active TCI state is associated with the type of symbols.

In an eleventh aspect, alone or in combination with one or more of the first through tenth aspects, the first active TCI state is associated with a lowest identifier of one or more TCI states for the full duplex mode associated with a PDSCH.

In a twelfth aspect, alone or in combination with one or more of the first through eleventh aspects, the first active TCI state is selected as the default TCI state based at least in part on a determination that the first active TCI state is usable for the full duplex mode.

In a thirteenth aspect, alone or in combination with one or more of the first through twelfth aspects, the first active TCI state is selected as the default TCI state based at least in part on a determination that a second active TCI state is not usable for the full duplex mode.

In a fourteenth aspect, alone or in combination with one or more of the first through thirteenth aspects, the first downlink transmission is received from a TRP of a plurality of TRPs of the base station, and the first active TCI state is selected as the default TCI state based at least in part on a determination that the first active TCI state is associated with the TRP.

In a fifteenth aspect, alone or in combination with one or more of the first through fourteenth aspects, the base station, when in the full duplex mode, transmits and receives, in a same frequency bandwidth, concurrently.

In a sixteenth aspect, alone or in combination with one or more of the first through fifteenth aspects, the base station, when in the full duplex mode, transmits a first set of symbols and receives a second set of symbols, in a same frequency bandwidth, where the first set of symbols and the second set of symbols are separated in time by less than a threshold.

In a seventeenth aspect, alone or in combination with one or more of the first through sixteenth aspects, the base station, when in the full duplex mode, transmits a first set of symbols in a first frequency bandwidth and, concurrently, receives a second set of symbols in a second frequency bandwidth, where the first frequency bandwidth and the second frequency bandwidth are separated in frequency by less than a threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
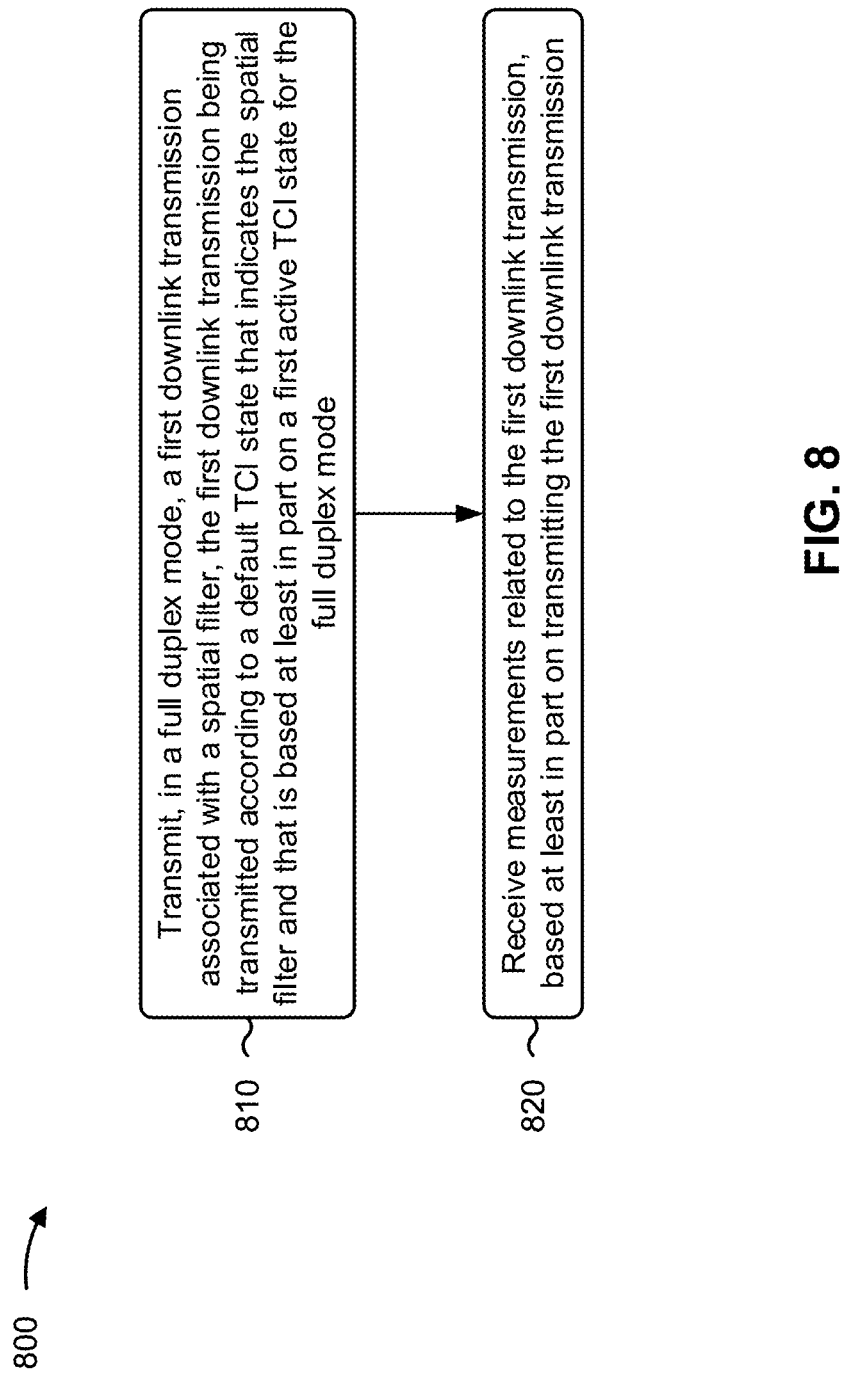
FIG. 8 is a diagram illustrating an example process performed by a base station, in accordance with the present disclosure.

FIG. 8 is a diagram illustrating an example process 800 performed, for example, by a base station, in accordance with the present disclosure. Example process 800 is an example where the base station (e.g., gNB 404 and/or base station 110) performs operations associated with activating and applying spatial filters in a full duplex mode.

As shown in FIG. 8, in some aspects, process 800 may include transmitting, to a UE (e.g., UE 402 and/or UE 120) in a full duplex mode, a first downlink transmission associated with a spatial filter (block 810). For example, the base station (e.g., using one or more of transmit processor 220, TX MIMO processor 230, modulator 232, antenna 234, controller/processor 240, memory 242, and/or scheduler 246) may transmit the first downlink transmission associated with the spatial filter, as described above. In some aspects, the first downlink transmission is transmitted according to a default TCI state that indicates the spatial filter. The default TCI state may be based at least in part on a first active TCI state for the full duplex mode.

As further shown in FIG. 8, in some aspects, process 800 may include receiving, from the UE, measurements related to the first downlink transmission, based at least in part on transmitting the first downlink transmission (block 820). For example, the base station (e.g., using one or more of demodulator 232, antenna 234, MIMO detector 236, receive processor 238, controller/processor 240, memory 242, and/or scheduler 246) may receive the measurements related to the first downlink transmission, as described above.

Process 800 may include additional aspects, such as any single aspect or any combination of aspects described below and/or in connection with one or more other processes described elsewhere herein.

In a first aspect, the first downlink transmission includes a CSI-RS.

In a second aspect, alone or in combination with the first aspect, the first downlink transmission includes a PDSCH message.

In a third aspect, alone or in combination with one or more of the first and second aspects, the first downlink transmission is scheduled by DCI.

In a fourth aspect, alone or in combination with one or more of the first through third aspects, transmitting the first downlink transmission includes transmitting the first downlink transmission according to the default TCI state when the DCI does not indicate a TCI state for the first downlink transmission.

In a fifth aspect, alone or in combination with one or more of the first through fourth aspects, transmitting the first downlink transmission includes transmitting the first downlink transmission according to the default TCI state when an amount of time between the base station transmitting the DCI and the base station transmitting the first downlink transmission satisfies a threshold.

In a sixth aspect, alone or in combination with one or more of the first through fifth aspects, the first active TCI state is associated with a second downlink transmission that includes at least one same symbol as the first downlink transmission.

In a seventh aspect, alone or in combination with one or more of the first through sixth aspects, the first active TCI state for the full duplex mode is independent of a second active TCI state for a half duplex mode.

In an eighth aspect, alone or in combination with one or more of the first through seventh aspects, the first active TCI state is selected as the default TCI state based at least in part on a determination that the first active TCI state is associated with a set of resources when the set of resources is within a same type of symbols as the first downlink transmission.

In a ninth aspect, alone or in combination with one or more of the first through eighth aspects, the set of resources is a CORESET.

In a tenth aspect, alone or in combination with one or more of the first through ninth aspects, the first downlink transmission includes a type of symbols, and the first active TCI state is selected as the default TCI state based at least in part on a determination that the first active TCI state is associated with the type of symbols.

In an eleventh aspect, alone or in combination with one or more of the first through tenth aspects, the first active TCI state is associated with a lowest identifier of one or more TCI states for the full duplex mode associated with a PDSCH.

In a twelfth aspect, alone or in combination with one or more of the first through eleventh aspects, the first active TCI state is selected as the default TCI state based at least in part on a determination that the first active TCI state is usable for the full duplex mode.

In a thirteenth aspect, alone or in combination with one or more of the first through twelfth aspects, the first active TCI state is selected as the default TCI state based at least in part on a determination that a second active TCI state is not usable for the full duplex mode.

In a fourteenth aspect, alone or in combination with one or more of the first through thirteenth aspects, the first downlink transmission is transmitted from a TRP of a plurality of TRPs of the base station, and the first active TCI state is selected as the default TCI state based at least in part on a determination that the first active TCI state is associated with the TRP.

In a fifteenth aspect, alone or in combination with one or more of the first through fourteenth aspects, the base station, when in the full duplex mode, transmits and receives, in a same frequency bandwidth, concurrently.

In a sixteenth aspect, alone or in combination with one or more of the first through fifteenth aspects, the base station, when in the full duplex mode, transmits a first set of symbols and receives a second set of symbols, in a same frequency bandwidth, where the first set of symbols and the second set of symbols are separated in time by less than a threshold.

In a seventeenth aspect, alone or in combination with one or more of the first through sixteenth aspects, the base station, when in the full duplex mode, transmits a first set of symbols in a first frequency bandwidth and, concurrently, receives a second set of symbols in a second frequency bandwidth, where the first frequency bandwidth and the second frequency bandwidth are separated in frequency by less than a threshold.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: receiving, from a base station in a full duplex mode, a first downlink transmission associated with a spatial filter; and decoding the first downlink transmission according to a default transmission configuration indicator (TCI) state that indicates the spatial filter, wherein the default TCI state is based at least in part on a first active TCI state for the full duplex mode.

Aspect 2: The method of Aspect 1, wherein the first downlink transmission includes a channel state information reference signal.

Aspect 3: The method of any of Aspects 1 through 2, wherein the first downlink transmission includes a physical downlink shared channel message.

Aspect 4: The method of any of Aspects 1 through 3, wherein the first downlink transmission is scheduled by downlink control information (DCI).

Aspect 5: The method of Aspect 4, wherein decoding the first downlink transmission comprises decoding the first downlink transmission according to the default TCI state when the DCI does not indicate a TCI state for the first downlink transmission.

Aspect 6: The method of Aspect 4, wherein decoding the first downlink transmission comprises decoding the first downlink transmission according to the default TCI state when an amount of time between the UE receiving the DCI and the UE receiving the first downlink transmission satisfies a threshold.

Aspect 7: The method of any of Aspects 1 through 6, wherein the first active TCI state is associated with a second downlink transmission that includes at least one same symbol as the first downlink transmission.

Aspect 8: The method of any of Aspects 1 through 7, wherein the first active TCI state for the full duplex mode is independent of a second active TCI state for a half duplex mode.

Aspect 9: The method of any of Aspects 1 through 8, wherein the first active TCI state is selected as the default TCI state based at least in part on a determination that the first active TCI state is associated with a set of resources when the set of resources is within a same type of symbols as the first downlink transmission.

Aspect 10: The method of Aspect 9, wherein the set of resources is a control resource set.

Aspect 11: The method of any of Aspects 1 through 10, wherein the first downlink transmission includes a type of symbols, and the first active TCI state is selected as the default TCI state based at least in part on a determination that the first active TCI state is associated with the type of symbols.

Aspect 12: The method of any of Aspects 1 through 11, wherein the first active TCI state is associated with a lowest identifier of one or more TCI states for the full duplex mode associated with a physical downlink shared channel.

Aspect 13: The method of any of Aspects 1 through 12, wherein the first active TCI state is selected as the default TCI state based at least in part on a determination that the first active TCI state is usable for the full duplex mode.

Aspect 14: The method of any of Aspects 1 through 13, wherein the first active TCI state is selected as the default TCI state based at least in part on a determination that a second active TCI state is not usable for the full duplex mode.

Aspect 15: The method of any of Aspects 1 through 14, wherein the first downlink transmission is received from a transmit-receive point (TRP) of a plurality of TRPs of the base station, and the first active TCI state is selected as the default TCI state based at least in part on a determination that the first active TCI state is associated with the TRP.

Aspect 16: The method of any of Aspects 1 through 15, wherein the base station, when in the full duplex mode, transmits and receives, in a same frequency bandwidth, concurrently.

Aspect 17: The method of any of Aspects 1 through 15, wherein the base station, when in the full duplex mode, transmits a first set of symbols and receives a second set of symbols, in a same frequency bandwidth, wherein the first set of symbols and the second set of symbols are separated in time by less than a threshold.

Aspect 18: The method of any of Aspects 1 through 15, wherein the base station, when in the full duplex mode, transmits a first set of symbols in a first frequency bandwidth and, concurrently, receives a second set of symbols in a second frequency bandwidth, wherein the first frequency bandwidth and the second frequency bandwidth are separated in frequency by less than a threshold.

Aspect 19: A method of wireless communication performed by a base station, comprising: transmitting, to a user equipment (UE) in a full duplex mode, a first downlink transmission associated with a spatial filter, wherein the first downlink transmission is transmitted according to a default transmission configuration indicator (TCI) state that indicates the spatial filter, wherein the default TCI state is based at least in part on a first active TCI state for the full duplex mode; and receiving, from the UE, measurements related to the first downlink transmission, based at least in part on transmitting the first downlink transmission.

Aspect 20: The method of Aspect 19, wherein the first downlink transmission includes a channel state information reference signal.

Aspect 21: The method of any of Aspects 19 through 20, wherein the first downlink transmission includes a physical downlink shared channel message.

Aspect 22: The method of any of Aspects 19 through 21, wherein the first downlink transmission is scheduled by downlink control information (DCI).

Aspect 23: The method of Aspect 22, wherein transmitting the first downlink transmission comprises transmitting the first downlink transmission according to the default TCI state when the DCI does not indicate a TCI state for the first downlink transmission.

Aspect 24: The method of Aspect 22, wherein transmitting the first downlink transmission comprises transmitting the first downlink transmission according to the default TCI state when an amount of time between the base station transmitting the DCI and the base station transmitting the first downlink transmission satisfies a threshold.

Aspect 25: The method of any of Aspects 19 through 24, wherein the first active TCI state is associated with a second downlink transmission that includes at least one same symbol as the first downlink transmission.

Aspect 26: The method of any of Aspects 19 through 25, wherein the first active TCI state for the full duplex mode is independent of a second active TCI state for a half duplex mode.

Aspect 27: The method of any of Aspects 19 through 26, wherein the first active TCI state is selected as the default TCI state based at least in part on a determination that the first active TCI state is associated with a set of resources when the set of resources is within a same type of symbols as the first downlink transmission.

Aspect 28: The method of Aspect 27, wherein the set of resources is a control resource set.

Aspect 29: The method of any of Aspects 19 through 28, wherein the first downlink transmission includes a type of symbols, and the first active TCI state is selected as the default TCI state based at least in part on a determination that the first active TCI state is associated with the type of symbols.

Aspect 30: The method of any of Aspects 19 through 29, wherein the first active TCI state is associated with a lowest identifier of one or more TCI states for the full duplex mode associated with a physical downlink shared channel.

Aspect 31: The method of any of Aspects 19 through 30, wherein the first active TCI state is selected as the default TCI state based at least in part on a determination that the first active TCI state is usable for the full duplex mode.

Aspect 32: The method of any of Aspects 19 through 31, wherein the first active TCI state is selected as the default TCI state based at least in part on a determination that a second active TCI state is not usable for the full duplex mode.

Aspect 33: The method of any of Aspects 19 through 32, wherein the first downlink transmission is transmitted from a transmit-receive point (TRP) of a plurality of TRPs of the base station, and the first active TCI state is selected as the default TCI state based at least in part on a determination that the first active TCI state is associated with the TRP.

Aspect 34: The method of any of Aspects 19 through 33, wherein the base station, when in the full duplex mode, transmits and receives, in a same frequency bandwidth, concurrently.

Aspect 35: The method of any of Aspects 19 through 33, wherein the base station, when in the full duplex mode, transmits a first set of symbols and receives a second set of symbols, in a same frequency bandwidth, wherein the first set of symbols and the second set of symbols are separated in time by less than a threshold.

Aspect 36: The method of any of Aspects 19 through 33, wherein the base station, when in the full duplex mode, transmits a first set of symbols in a first frequency bandwidth and, concurrently, receives a second set of symbols in a second frequency bandwidth, wherein the first frequency bandwidth and the second frequency bandwidth are separated in frequency by less than a threshold.

Aspect 37: An apparatus for wireless communication at a device, comprising a processor; memory coupled with the processor; and instructions stored in the memory and executable by the processor to cause the apparatus to perform the method of one or more Aspects of Aspects 1-18.

Aspect 38: A device for wireless communication, comprising a memory and one or more processors coupled to the memory, the memory and the one or more processors configured to perform the method of one or more Aspects of Aspects 1-18.

Aspect 39: An apparatus for wireless communication, comprising at least one means for performing the method of one or more Aspects of Aspects 1-18.

Aspect 40: A non-transitory computer-readable medium storing code for wireless communication, the code comprising instructions executable by a processor to perform the method of one or more Aspects of Aspects 1-18.

Aspect 41: A non-transitory computer-readable medium storing a set of instructions for wireless communication, the set of instructions comprising one or more instructions that, when executed by one or more processors of a device, cause the device to perform the method of one or more Aspects of Aspects 1-18.

Aspect 42: An apparatus for wireless communication at a device, comprising a processor; memory coupled with the processor; and instructions stored in the memory and executable by the processor to cause the apparatus to perform the method of one or more Aspects of Aspects 19-36.

Aspect 43: A device for wireless communication, comprising a memory and one or more processors coupled to the memory, the memory and the one or more processors configured to perform the method of one or more Aspects of Aspects 19-36.

Aspect 44: An apparatus for wireless communication, comprising at least one means for performing the method of one or more Aspects of Aspects 19-36.

Aspect 45: A non-transitory computer-readable medium storing code for wireless communication, the code comprising instructions executable by a processor to perform the method of one or more Aspects of Aspects 19-36.

Aspect 46: A non-transitory computer-readable medium storing a set of instructions for wireless communication, the set of instructions comprising one or more instructions that, when executed by one or more processors of a device, cause the device to perform the method of one or more Aspects of Aspects 19-36.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors coupled to the memory, the memory and the one or more processors configured to:
receive, from a base station in a full duplex mode, a first downlink transmission associated with a spatial filter; and
decode the first downlink transmission according to a default transmission configuration indicator (TCI) state that indicates the spatial filter, wherein the default TCI state is based at least in part on a first active TCI state for the full duplex mode.

2. The UE of claim 1, wherein the first downlink transmission includes a channel state information reference signal, a physical downlink shared channel message, or a combination thereof.

3. The UE of claim 1, wherein the first downlink transmission is scheduled by downlink control information (DCI).

4. The UE of claim 3, wherein decoding the first downlink transmission comprises decoding the first downlink transmission according to the default TCI state when the DCI does not indicate a TCI state for the first downlink transmission.

5. The UE of claim 3, wherein decoding the first downlink transmission comprises decoding the first downlink transmission according to the default TCI state when an amount of time between the UE receiving the DCI and the UE receiving the first downlink transmission satisfies a threshold.

6. The UE of claim 1, wherein the first active TCI state is associated with a second downlink transmission that includes at least one same symbol as the first downlink transmission.

7. The UE of claim 1, wherein the first active TCI state for the full duplex mode is independent of a second active TCI state for a half duplex mode.

8. The UE of claim 1, wherein the first active TCI state is selected as the default TCI state based at least in part on a determination that the first active TCI state is associated with a set of resources when the set of resources is within a same type of symbols as the first downlink transmission.

9. The UE of claim 8, wherein the set of resources is a control resource set.

10. The UE of claim 1, wherein the first downlink transmission includes a type of symbols, and the first active TCI state is selected as the default TCI state based at least in part on a determination that the first active TCI state is associated with the type of symbols.

11. The UE of claim 1, wherein the first active TCI state is associated with a lowest identifier of one or more TCI states for the full duplex mode associated with a physical downlink shared channel.

12. The UE of claim 1, wherein the first active TCI state is selected as the default TCI state based at least in part on a determination that the first active TCI state is usable for the full duplex mode.

13. The UE of claim 1, wherein the first active TCI state is selected as the default TCI state based at least in part on a determination that a second active TCI state is not usable for the full duplex mode.

14. The UE of claim 1, wherein the first downlink transmission is received from a transmit-receive point (TRP) of a plurality of TRPs of the base station, and the first active TCI state is selected as the default TCI state based at least in part on a determination that the first active TCI state is associated with the TRP.

15. The UE of claim 1, wherein the base station, when in the full duplex mode, transmits and receives, in a same frequency bandwidth, concurrently.

16. The UE of claim 1, wherein the base station, when in the full duplex mode, transmits a first set of symbols and receives a second set of symbols, in a same frequency bandwidth, wherein the first set of symbols and the second set of symbols are separated in time by less than a threshold.

17. The UE of claim 1, wherein the base station, when in the full duplex mode, transmits a first set of symbols in a first frequency bandwidth and, concurrently, receives a second set of symbols in a second frequency bandwidth, wherein the first frequency bandwidth and the second frequency bandwidth are separated in frequency by less than a threshold.

18. A base station for wireless communication, comprising:
a memory; and
one or more processors coupled to the memory, the memory and the one or more processors configured to:
transmit, to a user equipment (UE) in a full duplex mode, a first downlink transmission associated with a spatial filter, wherein the first downlink transmission is transmitted according to a default transmission configuration indicator (TCI) state that indicates the spatial filter, wherein the default TCI state is based at least in part on a first active TCI state for the full duplex mode; and
receive, from the UE, measurements related to the first downlink transmission, based at least in part on transmitting the first downlink transmission.

19. A method of wireless communication performed by a user equipment (UE), comprising:
receiving, from a base station in a full duplex mode, a first downlink transmission associated with a spatial filter; and
decoding the first downlink transmission according to a default transmission configuration indicator (TCI) state that indicates the spatial filter, wherein the default TCI state is based at least in part on a first active TCI state for the full duplex mode.

20. The method of claim 19, wherein the first downlink transmission includes a channel state information reference signal, a physical downlink shared channel message, or a combination thereof.

21. The method of claim 19, wherein the first downlink transmission is scheduled by downlink control information (DCI).

22. The method of claim 21, wherein the decoding comprises decoding the first downlink transmission according to the default TCI state when the DCI does not indicate a TCI state for the first downlink transmission.

23. The method of claim 21, wherein the decoding comprises decoding the first downlink transmission according to the default TCI state when an amount of time between the UE receiving the DCI and the UE receiving the first downlink transmission satisfies a threshold.

24. The method of claim 19, wherein the first active TCI state is selected as the default TCI state based at least in part on a determination that the first active TCI state is associated with a control resource set (CORESET) when the CORESET is within a same type of symbols as the first downlink transmission.

25. The method of claim 19, wherein the first downlink transmission includes a type of symbols, and the first active TCI state is selected as the default TCI state based at least in part on a determination that the first active TCI state is associated with the type of symbols.

26. The method of claim 19, wherein the first active TCI state is associated with a lowest identifier of one or more TCI states for the full duplex mode associated with a physical downlink shared channel.

27. The method of claim 19, wherein the first active TCI state is selected as the default TCI state based at least in part on a determination that the first active TCI state is usable for the full duplex mode.

28. The method of claim 19, wherein the first active TCI state is selected as the default TCI state based at least in part on a determination that a second active TCI state is not usable for the full duplex mode.

29. The method of claim 19, wherein the first downlink transmission is received from a transmit-receive point (TRP) of a plurality of TRPs of the base station, and the first active TCI state is selected as the default TCI state based at least in part on a determination that the first active TCI state is associated with the TRP.

30. A method of wireless communication performed by a base station, comprising:
- transmitting, to a user equipment (UE) in a full duplex mode, a first downlink transmission associated with a spatial filter, wherein the first downlink transmission is transmitted according to a default transmission configuration indicator (TCI) state that indicates the spatial filter, wherein the default TCI state is based at least in part on a first active TCI state for the full duplex mode; and
- receiving, from the UE, measurements related to the first downlink transmission, based at least in part on transmitting the first downlink transmission.

* * * * *